United States Patent Office 2,978,383
Patented Apr. 4, 1961

2,978,383
METHOD FOR THE PRODUCTION OF 1-GLUTAMIC ACID

Koichi Yamada, Tokyo, Japan
No Drawing. Filed Jan. 25, 1960, Ser. No. 4,237
5 Claims. (Cl. 195—47)

My invention relates to a method of producing 1-glutamic acid, and more particularly, it relates to a method for the production of 1-glutamic acid by the fermentation of nutrient fermentation media with the organism *Brevibacterium divaricatum* nov. sp.

In the past, 1-glutamic acid has been produced in a number of ways, the more generally used have included the manufacture of 1-glutamic acid either by isolation of hydrolyzed proteins, such as soybean cake and wheat gluten, or by cracking pyrolidone carboxylic acid obtained from Steffens molasses. The yield of 1-glutamic acid obtained by such method, however, has been dependent primarily upon the 1-glutamic acid content of the particular raw materials used. More recently, the production of 1-glutamic acid by fermentation of nutrient media with certain microorganisms including *E. coli, Aerobacter aerogenes, B. subtilis, Cephalosporium acremonium, Micrococcus varians, Micrococcus glutamicus*, etc., has been suggested. The various processes for the production of 1-glutamic acid previously available have been subject to various disadvantages from an operating point of view, in view of the fact that some are dependent on the particular character of and 1-glutamic acid content of the raw materials used which, in some cases, give low yields of products difficult to recover in satisfactory form. Other processes have required the use of unduly expensive starting materials. Still other processes have suffered from the disadvantage of forming by-products from which 1-glutamic acid is not easily and economically recovered. My new process represents an improvement over previous methods for the production of 1-glutamic acid in that good yields of the desired product are produced from readily obtainable and economic starting materials and the 1-glutamic acid thus obtained is readily recoverable in a form satisfactory for most purposes.

My new process for the production of 1-glutamic acid depends largely upon the use of a newly discovered microorganism designated as *Brevibacterium divaricatum* nov. sp., a culture of which has been deposited with the Northern Regional Research Laboratories of the U.S. Department of Agriculture under the number NRRL B–2311.

The microorganism *Brevibacterium divaricatum* nov. sp. has been isolated from sewage and from soils obtained from such places as fields, forests, reclaimed ground, and the like. The microorganism was isolated from such sources by suspending 0.1 g. of a sample in 5 ml. of sterilized water which was then cultivated with agar medium made up with a culture medium of the composition shown in Table I below.

TABLE I

| | Percent |
|---|---|
| Glucose | 2.0 |
| NH₄Cl | 0.4 |
| K₂HPO₄ | 0.1 |
| MgSO₄.7H₂O | 0.05 |
| Hydrolyzed casein | 0.02 |
| CaCO₃ | 0.5 |

Distilled water : tap water (1 : 1), pH 7.0.

The colonies formed after 48 hours' incubation on plates of the above composition at 28–30° C. were transferred to a slant culture medium of the same composition. The colonies formed on the latter were transferred to 5 ml. of liquid culture medium of the composition shown in Table II below and the latter incubated at 30° C. on a reciprocating shaker at a rate of 112 r.p.m.

TABLE II

| Medium Composition | A | B | C |
|---|---|---|---|
| | Percent | Percent | Percent |
| Glucose | 5.0 | 5.0 | 5.0 |
| NH₄Cl | 1.5 | | |
| NH₄(?)SO₄ | | 2.0 | |
| Urea | | | 0.8 |
| K₂HPO₄ | 0.1 | 0.1 | 0.1 |
| MgSO₄.7H₂O | 0.05 | 0.05 | 0.05 |
| Peptone | 0.2 | 0.2 | 0.2 |
| Meat Extract | 0.2 | 0.2 | 0.2 |
| CaCO₃ | 3.0 | 3.0 | |
| pH | 7.0 | 7.2 | 7.2 |

At the end of 72 hours' incubation, the microorganisms were removed by centrifuging, and the broth was tested by paper chromatography for 1-glutamic acid content. Cultures shown to produce 1-glutamic acid were then further screened in the same type culture medium to determine quantitative production of 1-glutamic acid.

The cultural characteristics whereby *Brevibacterium divaricatum* NRRL B–2311 is identified and distinguished from other microorganisms are as follows:

(1) Microscopic observation:
Cells are straight rods with rounded ends, 0.8 to 1.0 by 1.5 to 2.0 microns, usually single, occasionally in pairs or irregular masses. Elongated forms of 2.0 by 6.0 microns are often seen. No capsules or endospores are observed. The organism is non-motile, has no flagella, and is gram positive.

(2) Agar colonies (on bouillon agar 37° C., 20 hours' cultivation):
Abundant growth, pale yellowish gray, beaded to filiform, glistening, non-viscid.

(3) Agar slant:
Moderate growth, pale yellowish gray, beaded to filiform, glistening, non-viscid, medium unchanged.

(4) Gelatin stab:
None or scanty liquefaction.

(5) Nutrient broth:
Slightly turbid, yellowish brown flocculent sediment, no odor.

(6) Physiological properties:
(1) Temperature relations: optimum temperature 28–30° C.; maximum temperature 37° C.; minimum temperature 10° C. Thermal death point 62° C. for ten minutes.
(2) Litmus milk: Slightly acid production. Soft coagulum is formed. No peptonization on third day. Reduction of litmus begins on fourth day and ends on fourteenth day.
(3) Indole is not produced.
(4) Nitrate is reduced to nitrite.
(5) Ammonia is not produced.
(6) Hydrogen sulfite is not produced.
(7) Methyl red test negative.
(8) Voges-Proskner test negative.
(9) Catalase strongly positive.
(10) Urease positive.
(11) Reaction to free oxygen: aerobic.
(12) pH range: optimum pH 7.0–8.0.
(13) Biologic relationships: Saprophytic.
(14) 1-glutamic acid is produced in large quantity aerobically in the presence of carbohydrates, ammonium ion and inorganic salts.

(15) Acid formation from carbohydrates: As shown in Table III below, acid is produced from glucose, fructose, mannose, sucrose, maltose and glycerol.

TABLE III

| Carbohydrates | Acid Production | Gas in Peptone Water |
|---|---|---|
| (A) Monosaccharides: | | |
| Arabinose | − | − |
| Rhamnose | − | − |
| Xylose | − | − |
| Glucose | + | − |
| Fructose | + | − |
| Galactose | − | − |
| Mannose | + | − |
| (B) Disaccharides: | | |
| Lactose | − | − |
| Sucrose | + | − |
| Maltose | + | − |
| Trehalose | − | − |
| Melibiose | − | − |
| Cellobiose | − | − |
| (C) Polysaccharides: | | |
| Raffinose | − | − |
| Starch | − | − |
| Inulin | − | − |
| Dextrin | − | − |
| Glycogen | − | − |
| (D) Alcohols: | | |
| Glycerol | + | − |
| Arabitol | − | − |
| Adonitol | − | − |
| Mannitol | − | − |
| Sorbitol | − | − |
| Dulcitol | − | − |
| (E) Glucosides: | | |
| Salicin | − | − |

+: Acid or gas produced.
−: Acid or gas is not produced.

My new process for the production of 1-glutamic acid comprises incubating *Brevibacterium divaricatum* NRRL B-2311 in aqueous nutrient media at a temperature preferably between 28° C. and 31° C., under submerged conditions of agitation and aeration. Nutrient media which are useful for this process include a carbohydrate such as sucrose, glucose, fructose, and maltose, or crude sugar-containing materials prepared by hydrolyzing such starch-containing materials as sweet potatoes, potatoes, wheat, corn, cassava, and the like, these sugars or sugar-containing materials being used either separately or in mixtures. In addition to carbohydrates, the nutrient media also require the presence of a nitrogen source in either organic or inorganic form, such as urea, ammonium salts such as ammonium chloride, ammonium sulfate and ammonium tartrate, as a source of both inorganic nitrogen and growth stimulant material such as peptone, meat extracts, corn steep liquor, casein-hydrolyzate, wheat-bran-extracts, and the like, can be utilized with desirable results. Mineral salts such as magnesium sulfate, dipotassium phosphate, and other trace minerals can also be used with desirable results.

The media are preferably maintained at a pH ranging from 6 to 9 during the fermentation which ordinarily is completed within 2–3 days' time when conducted under aeration-agitation conditions or by shaking.

In the specific examples cited below for purposes of illustrating my new process for the production of 1-glutamic acid by means of *Brevibacterium divaricatum*, the 1-glutamic acid produced was recovered at the end of the fermentation by removing the mycelia by filtration or centrifuging. The resulting filtrate was then condensed and adjusted to a pH of 3.2 by the addition of acid and the glutamic acid was salted out at reduced temperatures. If a product of high grade or purity is desired, the condensate is first subjected to ion-exchange resin treatment in order to remove impurities before salting out. After absorption on the ion-exchange resin, the 1-glutamic acid is eluted therefrom and again condensed and then salted out at reduced temperature and recovered by centrifuging and then recrystallized if desired.

It is understood that the examples given below are for purposes of illustration only and that I am not bound to the specific ingredients or amounts thereof or to the other specific operating conditions other than previously broadly set forth herein.

*Example I*

*Brevibacterium divaricatum* NRRL B-2311 was cultivated for 20 hours at 30° C. in a seed culture medium of the following composition:

|   | Percent |
|---|---|
| Glucose | 3 |
| Urea | 0.5 |
| $K_2HPO_4$ | 0.1 |
| $MgSO_4 \cdot 7H_2O$ | 0.05 |
| Bouillon ext. | 0.2 |
| Wheat-bran ext. (5%) | 2 |

100 ml. of the following medium was then placed in 500 ml. flasks and the contents thereof sterilized for 10 minutes at 115° C.:

|   | Percent |
|---|---|
| Sweet potato hydrolyzate (2 atm. for 45 min.) | 10.5 (as glucose) |
| Urea | 1.3 |
| $K_2HPO_4$ | .1 |
| $MgSO_4 \cdot 7H_2O$ | 0.05 |
| Bouillon ext. | 0.2 |
| Wheat ext. (5%) | 3.0 | pH adjusted by NaOH to 7.2.

Each flask was then inoculated with 5 ml. of seed culture prepared as above described and the flask then incubated at 30° C. with shaking, while maintaining an oxygen absorption coefficient of $5.06 \times 10^{-6}$ gram mol of oxygen per ml. per minute. At the end of 24, 28, 36, and 48 hours, 1% of urea was added to the flasks to supply required nitrogen and to maintain the pH neutral or weakly alkalinic.

At the end of 40 hours, the fermenting medium was found to contain 3.3 g. of 1-glutamic acid per 100 ml. At the end of 72 hours, the fermented broth was filtered and the filtrate condensed to 1/10 volume and the pH adjusted to 3.2 by the addition of hydrochloric acid. The 1-glutamic acid then crystallized out upon cooling to 5° C. From 1 liter of medium fermented as above described 26.6 g. of crude 1-glutamic acid crystals were obtained. After condensation of the filtrate to 1/4 volume, 7.3 g. of crude 1-glutamic acid crystals were obtained. Upon re-crystallization of the two fractions of crude 1-glutamic acid, there was obtained 26.1 g. of refined crystals of 1-glutamic acid.

*Example II*

The culture of *Brevibacterium divaricatum* NRRL B-2311 used in this experiment was prepared as described in Example I above. The medium used in the fermentation was of the following composition:

| Glucose | g | 100 |
|---|---|---|
| Urea | g | 10 |
| $K_2HPO_4$ | g | 1 |
| $MgSO_4 \cdot 7H_2O$ | g | 0.5 |
| Wheat-bran ext. | ml | 40 |

Water to make 1 liter.
pH adjusted to 7.3.

80 ml. of the above medium was shake-cultured in a 500 ml. flask at 30° C. and 0.5% of urea and 1% of ammonium tartrate added thereto at the end of 18, 26, 32, 40 and 48 hours after inoculation. The amounts of l-glutamic acid produced at different time intervals are shown in Table IV below.

TABLE IV

| Fermentation Period, Hrs. | pH | Residual Sugar, mg./ml. | l-Glutamic Acid, mg./ml. |
|---|---|---|---|
| 0 | 7.3 | 102.0 | |
| 12 | 8.5 | 68.2 | 8.6 |
| 24 | 8.4 | 49.5 | 17.4 |
| 36 | 8.4 | 37.5 | 22.5 |
| 48 | 8.4 | 27.3 | 27.2 |
| 60 | 8.6 | 17.9 | 31.4 |
| 72 | 8.6 | 9.6 | 34.3 |

From one liter of the above medium, there was obtained as described in Example I a total of 33.2 g. of crude crystals of glutamic acid.

The substitution of other sugars, other sources of nitrogen, and other sources of growth stimulants give equally satisfactory results when fermentation media containing same are fermented by *Brevibacterium divaricatum*, from 20 to 40% of the carbohydrate consumed being converted into l-glutamic acid.

Now having disclosed my invention, what I claim is:

1. A process for the production of l-glutamic acid which comprises cultivating *Brevibacterium divaricatum* NRRL B–2311 in an aqueous nutrient medium containing an assimilable carbohydrate source and an assimilable nitrogen source at a temperature ranging from about 10 to about 37° C. and at a pH ranging from about 6 to about 9 under submerged aerobic conditions until substantial l-glutamic acid content is imparted to said medium.

2. The process of claim 1 wherein said cultivation takes place at a temperature ranging from 28° to 31° C.

3. The process of claim 1 wherein said cultivation takes place at a temperature of approximately 30° C. for a period of approximately 72 hours.

4. The process of claim 1 wherein the aqueous nutrient medium contains an assimilable carbohydrate selected from the group consisting of glucose, fructose, mannose, sucrose, maltose and glycerol and a source of nitrogen selected from the group consisting of ammonium salts and urea and a material selected from the group consisting of casate, peptone, corn steep liquor, meat extract, yeast extract, bran extract, and mixtures thereof.

5. A process as claimed in claim 1 wherein l-glutamic acid is recovered from the fermentation broth by filtering the fermented aqueous nutrient medium, partially condensing the filtrate, adjusting the filtrate to a pH of approximately 3.2 and crystallizing l-glutamic acid from said filtrate.

References Cited in the file of this patent

Proc. of the Int. Symposium on Enzyme Chemistry, Tokyo-Kyoto, 1957, Kinoshita et al., pp. 464 to 468, published by Maruzen, 1958, Tokyo.

UNITED STATES PATENT OFFICE
CERTIFICATION OF CORRECTION

Patent No. 2,978,383                                              April 4, 1961

Koichi Yamada

It is hereby certified that error appears in the above numbered patent requiring correction and that the said Letters Patent should read as corrected below.

In the heading to the printed specification, line 3, in the title of invention, for "1-GLUTAMIC ACID" read -- L-GLUTAMIC ACID --; column 1, lines 13 and 14, 15, 18, 20, 23, 25, 27, 32, 35, 41, 43 and 44, 46, and 48, column 2, lines 23, 24, 26, and 70, column 3, lines 38, 65 and 66, 67, and 75, column 4, lines 45, 48 and 49, 51, 53, and 56, and column 5, lines 1 and 23, for "1-glutamic acid", each occurrence, read -- L-glutamic acid --; column 5, TABLE IV, heading to fourth column thereof, for "1-Glutamic Acid" read -- L-Glutamic Acid --; same column 5, line 25, and column 6, lines 2, 17 and 18, and 21, for "1-glutamic acid", each occurrence, read -- L-glutamic acid --.

Signed and sealed this 17th day of October 1961.

(SEAL)
Attest:

ERNEST W. SWIDER                                  DAVID L. LADD
Attesting Officer                                Commissioner of Patents